United States Patent
Emmet et al.

(10) Patent No.: US 6,634,470 B2
(45) Date of Patent: Oct. 21, 2003

(54) BRAKE PAD

(75) Inventors: Robert A. Emmet, Rennerod (DE); Wilfried Strauss, Wald-Michelbach (DE)

(73) Assignee: Federal-Mogul Friction Products GmbH, Zweigniederlassung Technik Zentrum, Burscheid (DE)

(*) Notice: Subject to any disclaimer, the term of this patent is extended or adjusted under 35 U.S.C. 154(b) by 0 days.

(21) Appl. No.: 10/021,256

(22) Filed: Dec. 19, 2001

(65) Prior Publication Data
US 2002/0129996 A1 Sep. 19, 2002

(30) Foreign Application Priority Data
Dec. 19, 2000 (DE) .......................... 100 63 362

(51) Int. Cl.$^7$ .............................................. F16D 65/38
(52) U.S. Cl. ................................. 188/250; 188/258
(58) Field of Search ..................... 188/250 R, 251 A, 188/250, 250 B, 73.35, 73.36, 256, 257, 258, 259

(56) References Cited

U.S. PATENT DOCUMENTS

| | | | | |
|---|---|---|---|---|
| 3,064,769 A | * | 11/1962 | Billmeyer | 188/250 R |
| 3,490,563 A | * | 1/1970 | Hahm | 188/73.37 |
| 3,563,347 A | * | 2/1971 | Hahm | 188/73.1 |
| 3,693,764 A | * | 9/1972 | Anders | 188/73.1 |
| 4,552,252 A | * | 11/1985 | Stahl | 188/73.1 |
| 4,914,801 A | * | 4/1990 | Sweetmore et al. | 29/469.5 |
| 5,083,643 A | * | 1/1992 | Hummel et al. | 188/251 A |
| 5,429,216 A | * | 7/1995 | Kahr | 188/250 R |
| 5,515,950 A | * | 5/1996 | Kwolek | 188/73.36 |
| 6,041,893 A | | 3/2000 | Ervens et al. | |
| 6,135,244 A | * | 10/2000 | Le Bris | 188/73.37 |
| 6,283,258 B1 | * | 9/2001 | Chen et al. | 188/250 E |
| 6,390,251 B1 | * | 5/2002 | Hasegawa | 188/251 M |
| 6,405,840 B1 | * | 6/2002 | Foster et al. | 188/250 B |

FOREIGN PATENT DOCUMENTS

| | | |
|---|---|---|
| DE | 29 35 943 A1 | 3/1981 |
| DE | 30 06 406 A1 | 8/1981 |
| DE | 41 26 841 A1 | 2/1993 |
| DE | 197 06 123 A1 | 8/1998 |

OTHER PUBLICATIONS

Ogiwara NGAO, "Friction Material", Patent Abstracts of Japan No. 58–211031, published on Dec. 8, 1983.*

* cited by examiner

Primary Examiner—Jack Lavinder
Assistant Examiner—Benjamin A Pezzlo
(74) Attorney, Agent, or Firm—Venable, LLP; Marina V. Schneller

(57) ABSTRACT

A brake pad, preferably used disc bakes, comprises a profiled metal back plate, to which at least one friction lining is attached, characterized in that a material with lower heat conductivity, relative to the friction lining, is provided in at least some profile sections.

7 Claims, 2 Drawing Sheets

BRAKE PAD

CROSS-REFERENCE TO RELATED APPLICATION

This application claims the benefit of German Patent Application 100 63 362.5, filed Dec. 19, 2000, which is relied upon and incorporated by reference herein.

1. Field of the Invention

The invention relates to a brake pad, in particular used for disc brakes, comprising a metal back plate provided with profiles and at least one friction lining attached thereto.

2. Background of the Invention

A brake pad is disclosed in the DE-A 197 06 123, in which the back plate has at least two sections with different thickness in circumferential direction. The sections at the same time should be designed to relieve the thermal stress on an activation element that operatively engages the brake pad. Described are wave-shaped profiles, rectangular profiles, indentations, depressions or the like. Even if a certain thermal de-stressing or uncoupling can already be realized with this, undesirable temperatures resulting from increased braking forces are still effective in the region of the activation element, particularly the brake cylinder or its peripheral components, which can result in damages.

A brake pad having a metal back plate with a friction lining (e.g. the brake pad) attached to it is also disclosed in the U.S. Pat. No. 6,041,893. The area between friction lining and back plate contains at least one additional layer, to which certain damping qualities are assigned and which sounds acoustical warnings when the friction lining is abraded.

It is the object of the invention to optimize a brake shoe, so as to avoid any temperature-dependent damage to the activation element, especially to the brake cylinder or the peripheral components cooperating with it.

This object is solved with a material having lower heat conductivity, relative to the friction lining, at least in some profile sections. Advantageous modifications of the subject matter of the invention follow.

SUMMARY OF THE INVENTION

According to a modification of the prior art, in particular the DE-A 197 06 123, the subject matter of the invention permits a clear uncoupling (e.g., dissipation) of the heat flow between friction lining (e.g., of the brake pad) and activation or actuating element, especially the brake cylinder, as well as all components connected thereto, such as sealing members or the like. The frictional heat transferred in particular from the brake disc to the friction lining when the brake cylinder(s) is (are) activated thus no longer disseminates directly to the metal back plate and therefore also the activation element. Rather, the subsequently installed material with low heat conductivity, provided in particular in the profiles, mostly compensates for the temperature.

DETAILED DESCRIPTION OF THE INVENTION

A further uncoupling (dissipation of heat) of the temperature flow is realized with the special profile design, particularly the raised areas that extend only partially in the direction of the activation element. The segment-like raised areas, in particular arranged partially along the periphery of a circle, essentially remain inside the diameter (the cross-sectional surface) of the activation element(s), so that the area of contact between said element(s) and the metal back plate is limited to these segments.

According to another inventive idea, the material with lower heat conductivity can either be provided only in the region of the profiles or can be arranged such that it extends over the imagined circular periphery of the segments. Alternatively, the material with low heat conductivity can also be allowed to extend essentially over the cross-sectional surface of the friction lining, between the lining and the metal back plate.

The metal back plate can either be a cast iron plate with formed-in profiles or a conventional steel back plate with corresponding embossed areas. The profiles projecting from the metal back plate in the direction of the activation element preferably have a height of <2 mm, in particular of between 0.5 and 1.0 mm.

The raised areas resulting from the profiling of the metal back plate have the following advantages:
- a reduction in the heat conductivity;
- a reduction in the heat radiation;
- an increase in the convective heat transfer to the environment.

The subject matter of the invention preferably is used with all disc brakes (hydraulic and pneumatic). This solution also makes it possible to dispense with additional layers, as described in the prior art according to the U.S. Pat. No. 6,041,893.

Preferred materials for the profiles, which exhibit decreased thermal conductivity compared to the frictional lining comprise, consist essentially of and consist of as well as their compounds, the following components: magnesium oxide, vermiculite, fibers, in particular PAN (polyacrylnitrile) fibers, rock wool, recycled materials and resins, especially phenol resins; also conceivable are admixtures of silicic acid and glass fibers as well as wollastonite. The following is a list of possible ranges for materials with low heat conductivity (all information provided in weight %):

| | |
|---|---|
| magnesium oxide | 10–14% |
| vermiculite | 30–35% |
| PAN fibers | 1–2% |
| rock wool | 18–22% |
| glass fiber | 1–3% |
| wollastonite | 6–8% |
| phenol resin | 12–16% |
| recycled material | 5–8% |
| silicic acid | 3–5% |

The subject matter of the invention is shown in the drawing with the aid of an exemplary embodiment and is described as follows.

Figure 1:
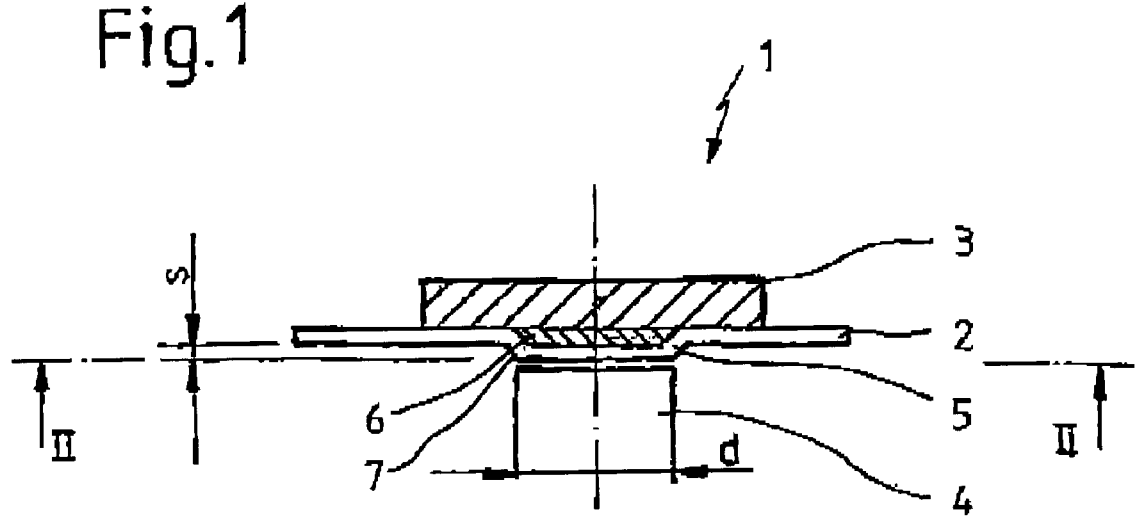
FIG. 1 is a schematic diagram showing different views of a brake pad.
Figure 2:
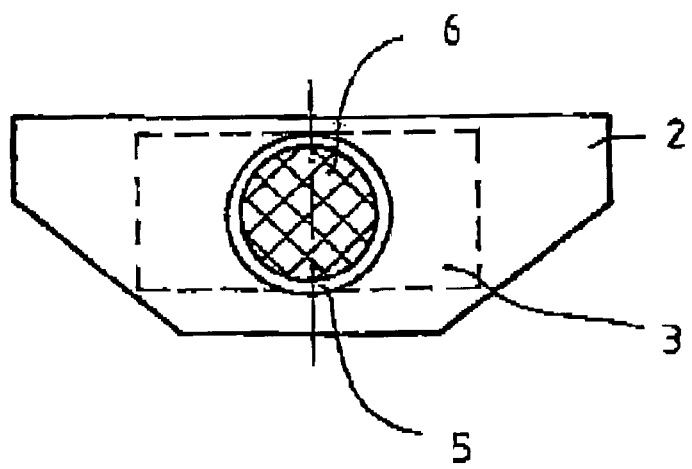
FIG. 2 is a view along the line II—II in FIG. 1.

The schematic diagram in FIG. 1 shows a brake pad 1 according to the invention, comprising a metal back plate 2 as well as a friction lining 3, for example attached to the back plate 2 with vulcanization. For this exemplary embodiment, the brake pad 1 operates jointly with a brake cylinder 4 or actuating as activation element and is provided with a profiling 5 in the form of a depression/raised area. The cross-sectional shape of this area is essentially provided within the diameter d of brake cylinder 4. The metal back plate 2 for this example is a steel plate with embossed [molded-in] profile 5. A lining material 6 with lower heat conductivity than the friction material 3 itself is inserted on the friction lining side into the profile 5. As a result of this measure, the heat flow from the friction lining 3 in the direction of the metal back plate 2, as well as the adjoining brake cylinder 4 can be reduced, such that the temperature transmission is blocked in particular in the problematic region of the brake cylinder 4. The raised area 7 of profile 5, which is directed toward the brake cylinder 4, has a height of s=1 mm. The profile 5 has a circular cross-sectional surface (FIG. 2).

Figure 3:
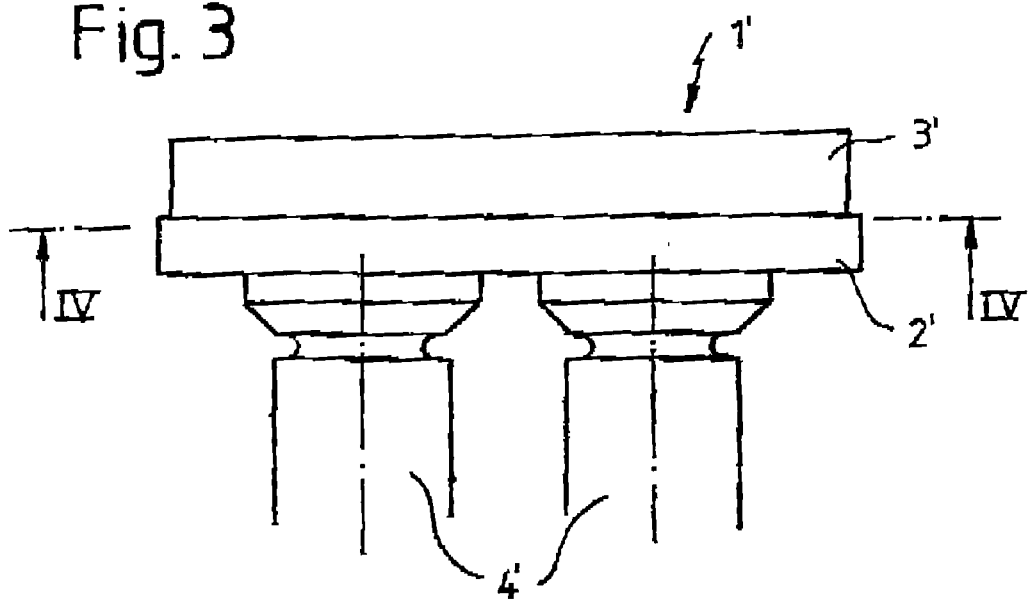
FIG. 3 is a schematic diagram of a brake pad with two activation elements.

FIG. 3 shows another schematic diagram of a brake pad 1', comprising a cast iron back plate 2' as well as a friction lining 3'. Two brake cylinders 4' are used for this example.

Figure 4:
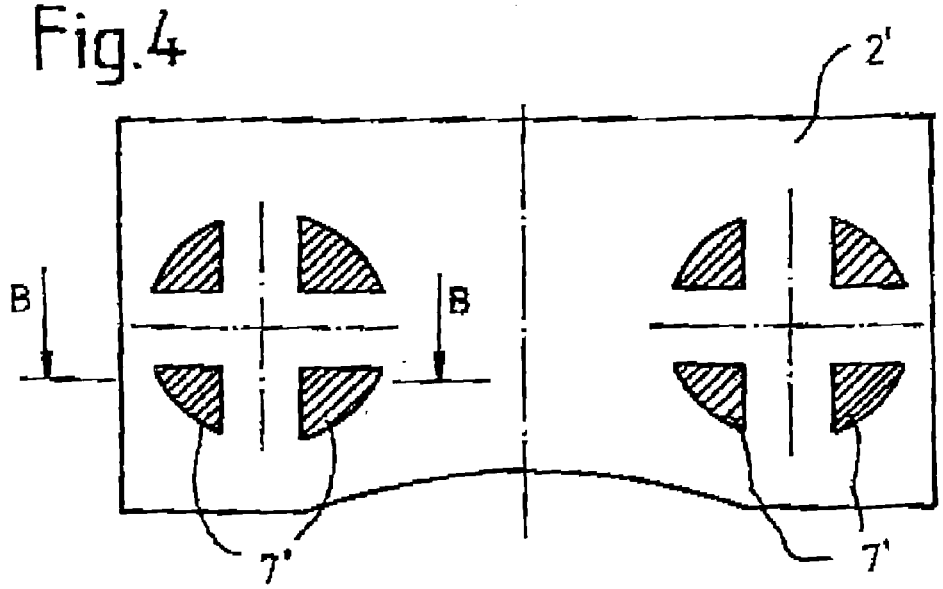
FIG. 4 is a representation of segment-shaped raised areas on the back plate of the brake pad.

FIG. 4 shows a cross-sectional view through the back plate 2', along the line IV—IV, wherein segment-shaped profiles 5' are provided in the brake cylinder 4' region and are arranged along an imagined circular periphery. These profile-shaped areas 7' extend in the direction of the force component and were molded into the cast-iron plate 2' during the production.

Figure 5:
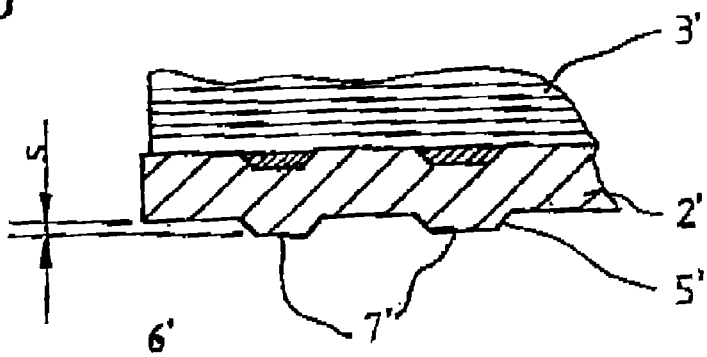
FIG. 5 is a cross section through a section of the brake pad shown in FIG. 3.

FIG. 5 shows a section along the line B—B in FIG. 4. Visible are the back plate 2', the friction lining 3' as well as the worked in profiles 5', which form a depression on the friction-layer side and a raised area 7' on the force component side. As previously mentioned in connection with FIG. 1, a lining material 6 with reduced heat conductivity relative to the friction lining is provided on the side of the friction lining.

FIGS. 2 to 5 show that the areas with raised profile 7,7' are essentially provided within the cross-sectional area of the respective brake cylinder 4. Heat can thus be transferred exclusively in those regions from the friction lining 3' via the back plate 2' in the direction of the brake cylinder 4'. As a result of the lining material 6', the transfer of heat is reduced in such a way that damages to the brake cylinder 4' and the cooperating components, such a protective caps or the like, can be securely avoided. The profiles 7, 7' in this example have a height of 1.0 mm. The material 6, 6' used for the exemplary embodiments has the following composition (all data provided in weight %). However, the subject matter of the invention is not limited to this composition.

|  |  |
|---|---|
| Magnesium oxide | 12.00 |
| vermiculite | 33.00 |
| PAN fibers | 1.50 |
| rock wool | 20.00 |
| glass fiber | 2.00 |
| wollastonite | 7.00 |
| phenol resin | 14.00 |
| recycled material | 6.50 |
| silicic acid | 4.00 |

What is claimed is:

1. A brake pad, for disc brakes, comprising
   a metal back plate provided with at least one indentation,
   wherein the at least one indentation is formed by several raised areas or depressions each having an approximately circular segment shape with an arcuate edge
   wherein the raised areas or the depressions are positioned such that the arcuate edge of each segment lies approximately on a common radius and
   wherein the indentation is characterized by a height or depth ranging from 0.5 to 1.0 mm;
   at least one friction layer which is attached to said metal back plate, and a third element comprising a material with lower heat conductivity than a heat conductivity value of the friction lining, wherein said third element is disposed in said at least one indentation.

2. A brake pad according to one of the claim 1, wherein the raised areas or the depressions are provided at a predetermined distance to each other.

3. A brake pad according to claim 1, wherein the material with lower heat conductivity comprises the following material components: magnesium oxide, vermiculite, glass fibers or PAN fibers, rock wool, wollastonite, silicic acid, and phenol resins as bonding agents.

4. A brake pad according to claim 1, characterized in that the material with lower heat conductivity has the following composition (provided in weight %):

|  |  |
|---|---|
| Magnesium oxide | 12.00 |
| Vermiculite | 33.00 |
| PAN fibers | 1.50 |
| Rock wool | 20.00 |
| Glass fiber | 2.00 |
| Wollastonite | 7.00 |
| Phenol Resin | 14.00 |
| Recycled material | 6.50 |
| Silicic acid | 4.00. |

5. A brake pad according to claim 1, in combination with a brake cylinder wherein said at least one indentation is provided in a region of engagement of said at least one brake cylinder with said metal back plate.

6. A brake pad according to claim 5, wherein said indentation is formed by raised areas on a brake cylinder side of said metal back plate.

7. A brake pad according to claim 5, wherein said indentation is formed by depressions a friction lining side of said metal back plate.

* * * * *